United States Patent [19]

Toyoura et al.

[11] 4,204,583
[45] May 27, 1980

[54] WHEELED VEHICLE WITH ROTATABLE ENDLESS TRACK

[76] Inventors: Hirozumi Toyoura, No. 3285, Izumi, Komae-shi, Tokyo; Masaharu Saito, No. 42, Myojindai, Hodogaya-ku, Yokohama-shi, Kanagawa-ken, both of Japan

[21] Appl. No.: 823,044

[22] Filed: Aug. 8, 1977

[30] Foreign Application Priority Data

Aug. 8, 1976 [JP] Japan .................................. 51-094240

[51] Int. Cl.² ............................................ B62D 55/04
[52] U.S. Cl. ..................................... 180/9.28; 180/6.7
[58] Field of Search ....................... 180/9.26, 9.28, 9.3, 180/9.5, 9.52, 44 R, 44 M, 49, 6.2, 6.7, 233, 245, 246; 305/51, 54; 74/24.1 R, 24.11 R

[56] References Cited

U.S. PATENT DOCUMENTS

| | | | |
|---|---|---|---|
| 1,340,789 | 5/1920 | Ollivier | 180/9.28 |
| 1,729,374 | 9/1929 | Ehrhart | 180/9.28 |
| 2,110,439 | 3/1938 | Gordon | 74/242.11 R |
| 3,263,763 | 8/1966 | Adams | 180/6.2 |
| 3,374,036 | 3/1968 | Shaw | 305/54 |

*Primary Examiner*—Richard A. Bertsch
*Assistant Examiner*—John A. Carroll
*Attorney, Agent, or Firm*—Armstrong, Nikaido, Marmelstein & Kubovcik

[57] ABSTRACT

A wheeled vehicle having a source of driving power and a chassis extending longitudinally of the vehicle, which comprises a rotatable endless track device disposed between front and rear wheels of the vehicle, a system for selectively raising and lowering the endless track device with respect to the chassis whereby when the endless track device is lowered it is brought into contact with the road surface, and a connecting apparatus for drivably connecting the endless track means with the source of driving power when the endless track device is lowered and brought into contact with the road surface.

4 Claims, 6 Drawing Figures

WHEELED VEHICLE WITH ROTATABLE ENDLESS TRACK

BACKGROUND OF THE INVENTION

This invention relates to a specialized wheeled vehicle having an endless track often referred to as a caterpiller track.

Ordinary wheeled vehicles presently in use are driven by front-wheel drive, rear-wheel drive or both front and rear-wheel drive systems. These vehicles are capable of travelling at considerable speed on ordinary roads but they tend to slip and skid and thus cannot be driven safely on desert roads, snow or ice-covered roads, muddy roads and other poor road surfaces owing to the fact that they lack special equipment designed for such purposes. Sandy areas are particularly troublesome because once the vehicle begins slipping it is impossible to move either backward or forward. This may chiefly be ascribed to the fact that there is substantially linear contact between the surface of the land and the powered rear wheels of the vehicle so that the wheels begin to burrow into the surface at the outset of slipping and continue until they are deeply entrenched. Should such a situation develop in a desert region and the vehicle becomes completely immobile, the life of the driver could well be imperilled.

In an effort to overcome these disadvantages a number of specialized vehicles have been developed. For example, there is a crawler-type vehicle which is equipped with an endless caterpiller-type track. The crawler, due to a reduced amount of pressure between the tracks and a unit square area of road surface, is capable of travelling over fairly poor roads but it is an expensive vehicle because of its complicated structure. The crawler is also not suited to travelling at high speed and thus cannot traverse long distances. The vehicle consumes an exorbitant amount of fuel. This type of vehicle is used mainly for pulling or pushing purposes and is not intended for large scale transportation of articles. In addition, this type of vehicle is suited for small scale work in a small area but is lacking in workability in large scale work. Furthermore, it is necessary to obtain legal permission before a crawler can utilize on ordinary roads since the tracks are likely to subject the road surfaces to damage.

Another type of specialized vehicle which can be found in the prior art is the so-called semi-crawler which utilizes general purpose tires as front wheels and an endless track in place of rear wheels. However, like the crawler, the semi-crawler can only travel at low speeds and is not suitable for running over long distances. The same problems arise for other types of specialized vehicles as well. For example, vehicles provided with large-size tires having deep, widened treads, or vehicles equipped with a large number of extremely wide tires cannot travel at high speed and are costly because of their complex construction.

SUMMARY OF THE INVENTION

Accordingly, an object of the invention is the elimination of the above-mentioned disadvantages found in conventional vehicles through the provision of a simply constructed, inexpensive wheeled vehicle having an endless track which is brought into operation only when the vehicle travels through a desert or on a bad road such as a snow-covered or muddy roadway thereby to allow the vehicle to run freely over these surfaces, the vehicle being adapted to operate as an ordinary wheeled vehicle and at high speed when travelling on an ordinary road.

According to the principal feature of the invention, the above-mentioned object is attained through the provision of a freely elevatable endless track having a suitable driving source, the endless track being provided on the chassis of the vehicle approximately midway between the front and rear wheels. More specifically, the present invention is characterized in that disposed between the front and rear wheels of the vehicle is a rotatable track which is elevatable with respect to the chassis of the vehicle. A driving source is cut off from the driving wheels which drive the endless track when the track is in the raised position and thus not in contact with the road surface, the driving source being connected to said driving wheels of the track only when the track is in the lowered position and in contact with the road surface.

BRIEF DESCRIPTION OF THE DRAWINGS

A more detailed description of the invention will now be had with reference to a preferred embodiment as depicted in the accompanying drawings, in which.

DETAILED DESCRIPTION OF THE PREFERRED EMBODIMENT

Figure 1:
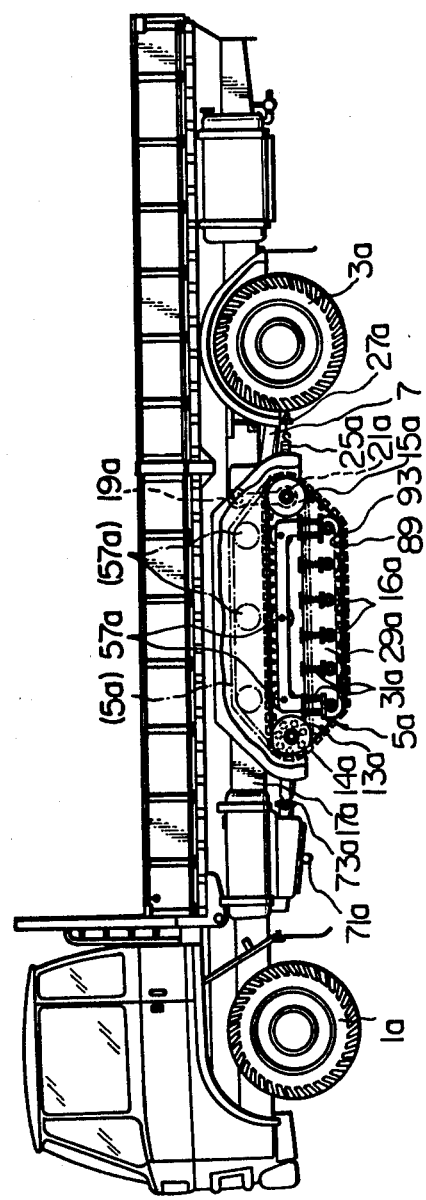
FIG. 1 is a side view showing the construction of a specialized wheeled vehicle for a case in which the present invention is adapted to a truck.
Figure 2:
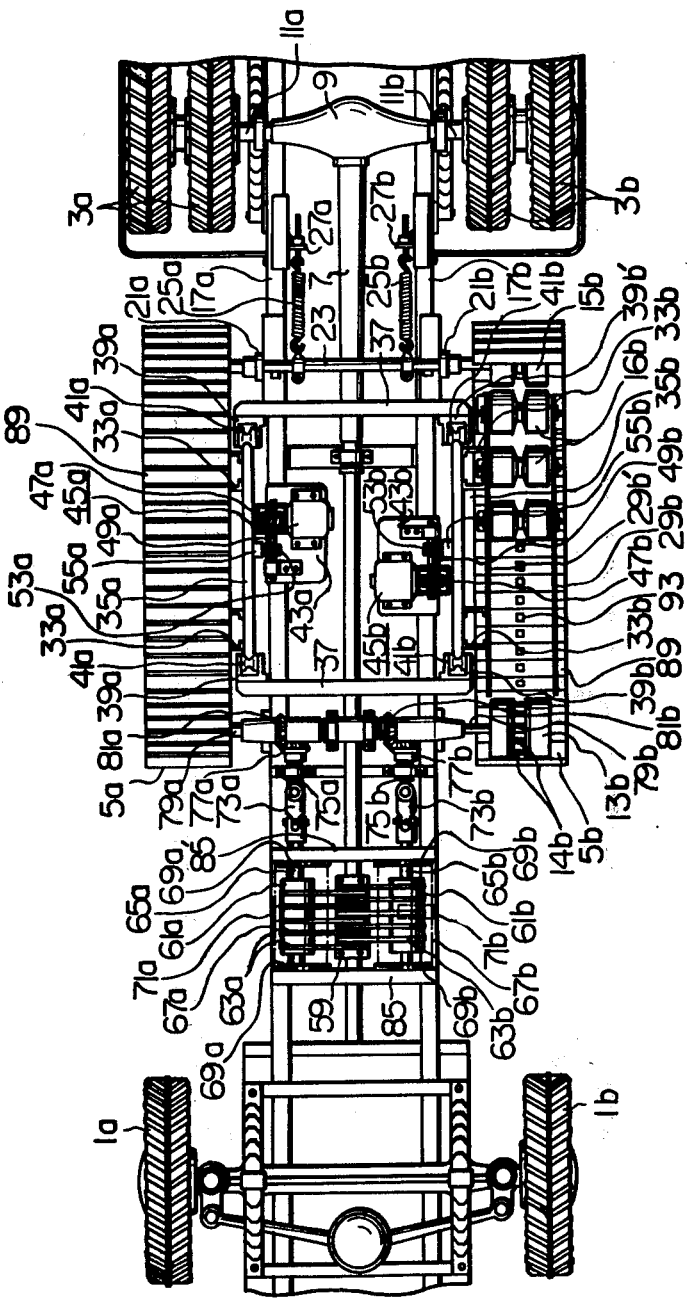
FIG. 2 is a bottom view showing the essential portions of FIG. 1.

FIG. 1 is a side view showing the construction of the specialized wheeled vehicle in accordance with one embodiment of the invention, and FIG. 2 is a bottom view showing the essential portions of the same. Although the present embodiment is based upon an ordinary long-body, full-sized truck, it is to be understood that the present invention is not limited to trucks alone and that it can readily be applied to passanger cars, vans, buses and all other types of vehicles having front and rear wheels, such as vehicles for agriculture, forestry, construction and military uses.

In the present embodiment, an auxiliary drive system is provided which includes a pair of endless tracks 5a, 5b are disposed approximately midway between front wheels 1a, 1b and double rear wheels 3a, 3b, with one track provided on each side of the truck chassis. The tracks, as shown by the solid line, may be lowered to the road surface on which the front and rear wheels rest, or may be elevated to a position where they do not contact the road surface, as illustrated by the broken line. According to this construction, endless tracks 5a, 5b are retained in the elevated position out of contact with the road surface when the truck travels on an ordinary roadway thereby allowing the truck to travel as an ordinary wheeled vehicle at high speed since only the front wheels 1a, 1b and rear wheels 3a, 3b are operative.

When the truck is to travel through the desert or on a snow-covered or muddy road, endless tracks 5a, 5b are lowered and held in the position shown in FIG. 1 which enables the truck to run easily even on bad roads since the front wheels 1a, 1b, rear wheels 3a, 3b and tracks 5a, 5b are in contact with the road surface.

Rear wheels 3a, 3b in the present embodiment are driven as in any wheeled vehicle. In other words, rear axles 11a, 11b are rotated by a propeller shaft 7 acting through the intermediary of a differential gear 9. The endless tracks 5a, 5b are guided by driving wheels 13a, 13b, guide wheels 15a, 15b, and by a plurality of freelyrotatable wheels 16a, 16b. As the guiding and elevation mechanisms of the left and right endless tracks 5a, 5b are entirely symmetrical, they will be treated and described together. The driving wheels 13a, 13b include a plurality of shafts 14a, 14b for the purpose of meshing with the teeth which feed the tracks, the shafts being disposed between two circular plates and equally spaced along their outer periphery. The driving wheels 13a, 13b are mounted to chassis 17a, 17b so as to be freely rotatable and yet incapable of moving even when the endless tracks 5a, 5b are raised or lowered. Guide wheels 15a, 15b are rotatably disposed at the ends of a shaft 23 secured between the ends of levers 21a, 21b the other ends of which are attached to shafts (one being designated by reference numeral 19a) secured to respective chassis 17a, 17b. Fixed to shaft 23 is one end of tension springs 25a, 25b the other ends of which are fastened to the ends of respective levers 27a, 27b that are secured to chassis 17a, 17b, the springs 25a, 25b normally acting to urge guide wheels 15a, 15b toward the rear of the truck. This is intended to prevent the slackening and displacement of endless tracks 5a, 5b when the tracks are raised or lowered, as will be described later. Furthermore, in order to facilitate the raising and lowering of the endless tracks, the guide wheels 15a, 15b are designed so that they do not engage with the track feeding teeth which project inwardly of the tracks 5a, 5b.

Figure 3:
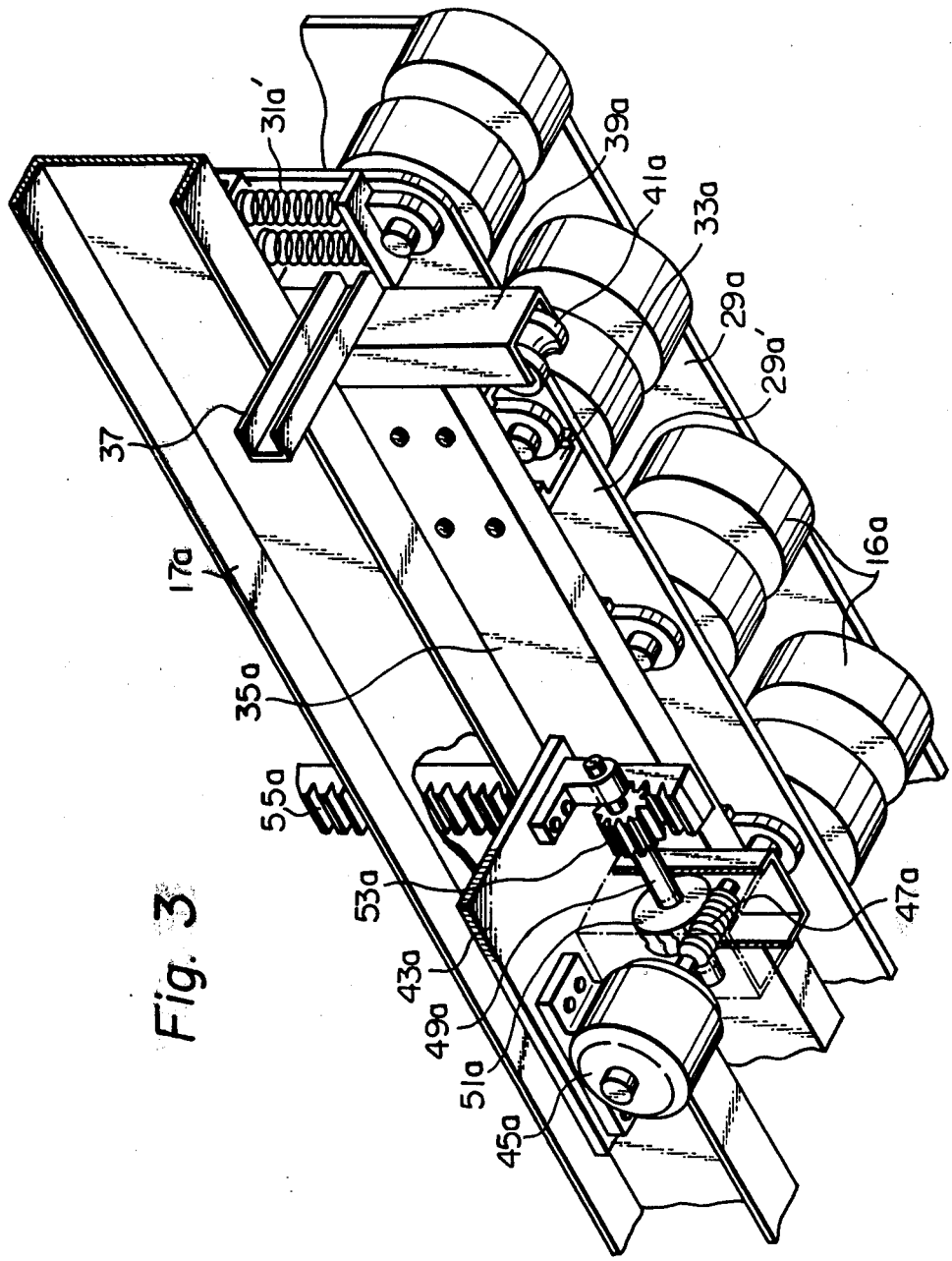
FIG. 3 is a perspective view showing the construction of the raising and lowering mechanism for the endless tracks.

Reference will now be had to FIG. 3 for a description of the mechanism for raising and lowering the endless tracks 5a, 5b. As previously set forth, endless tracks 5a, 5b are raised and lowered without the accompanying movement of driving wheels 13a, 13b. This is accomplished by raising and lowering the freely rotatable wheels 16a, 16b. More specifically, the plurality of rotatable wheels 16a, 16b are mounted in a rotatable manner between a pair of parallel plates 29a, 29a' and 29b, 29b'. In this case, one or a plurality of vertically displaceable coil springs 31a, 31a', 31b, 31b' (31b, 31b' are not shown) are secured to both ends of the axles which support the wheels 16a, 16b. Parallel plates 29a' and 29b' on the inward sides of the track are connected to respective raising and lowering members 35a, 35b by means of connecting members 33a, 33b. Both ends of the raising and lowering members are tapered and slide over a plurality of drum-shaped rollers 41a, 41b rotatably accommodated within channel members 39a, 39a' and 39b, 39b' which are attached to a frame 37 secured to chassis 17a, 17b. Further, secured to chassis 17a, 17b are electric motor supporting plates 43a, 43b on which motors 45a, 45b are mounted. Worm gears 47a, 47b are fixed to the drive shafts of the electric motors. Supporting plates 43a, 43b also provide rotational support for shafts 49a, 49b disposed at right-angles to the drive shafts of the respective motors, these shafts 49a, 49b serving to mount worm wheels 51a, 51b which engage with worm gears 47a, 47b, and pinions 53a, 53b which engage with racks 55a, 55b secured to raising and lowering members 35a, 35b.

When electric motors 45a, 45b are caused to rotate in a prescribed direction, pinions 53a, 53b rotate due to the transmission of turning effort by way of worm gears 47a, 47b and shafts 49a, 49b. Pinions 53a, 53b apply this turning effort to racks 55a, 55b which, being secured to raising and lowering members 35a, 35b, cause these members to ascend or descend while being guided by rollers 41a, 41b. Further, rotatably provided between parallel plates 29a, 29a', and 29b, 29b' are three auxiliary guide rollers 57a, 57b which are adapted to guide the elevated endless tracks 5a, 5b. It may thus be appreciated that parallel plates 29a, 29a' and 29b, 29b', being joined to the raising and lower members 35a, 35b, will ascend or descend by vertically moving the raising and lowering members. Accordingly, endless tracks 5a, 5b can be made to ascend or descend in response to the vertical displacement of auxiliary guide rollers 57a, 57b which are mounted on, and thus follow the movement of, said parallel plates. When endless tracks 5a, 5b are in the lowered position as shown in FIG. 1, the lowermost surface of each track will lie on a line passing through the points at which the respective front wheels 1a, 1b and rear wheels 3a, 3b contact the surface of the ground, thereby bringing the front and rear wheels as well as the tracks into contact with the ground at the same time. On the other hand, when the endless tracks are in the elevated position, the lowermost surface of the treads clears the road surface by, for example, approximately 300 to 400 mm. It follows therefore that the length of the racks 55a, 55b is chosen so as to allow suitable vertical displacement of the tracks.

Figure 4:
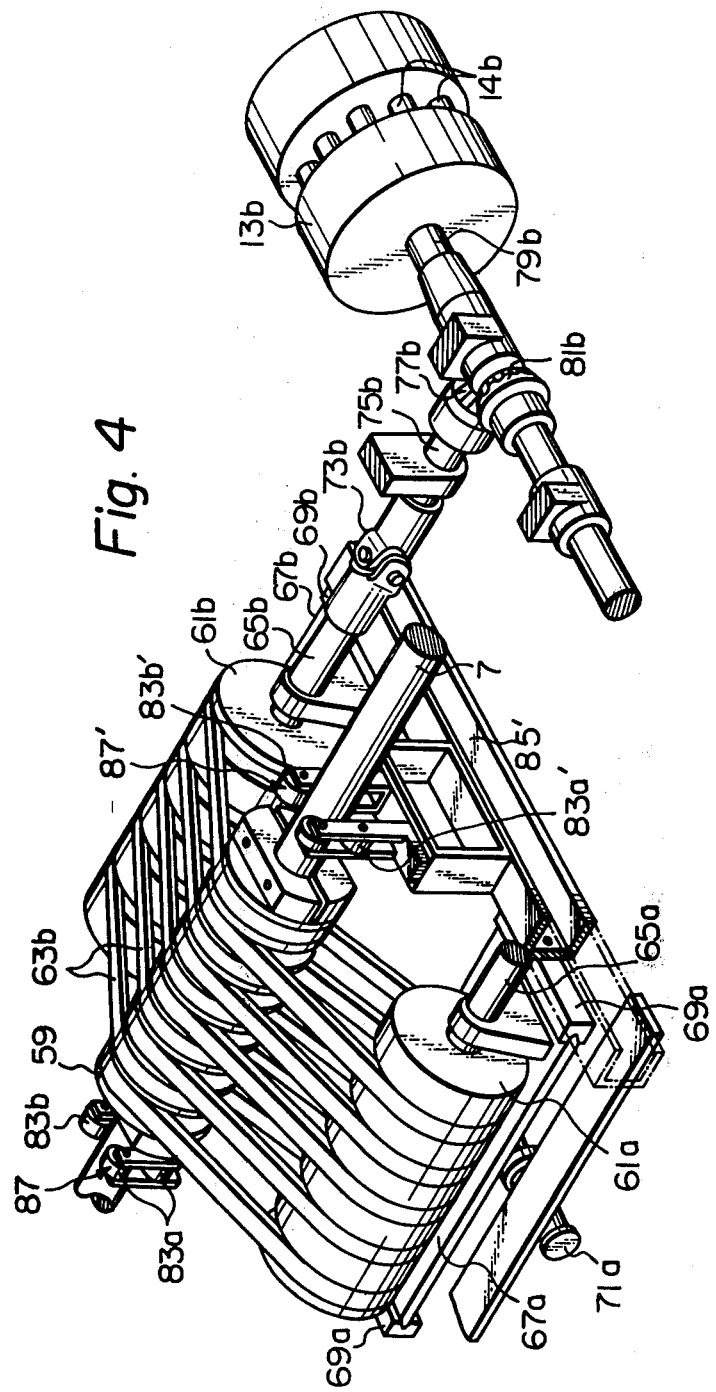
FIG. 4 is a perspective view showing the driving mechanism for the endless tracks.

The driving mechanism for the endless track driving wheels 13a, 13b will now be described with FIG. 4 serving as an additional reference. In this embodiment, endless tracks 5a, 5b are driven by the same engine which drives the rear wheels. In other words, driving wheels 13a, 13b for the endless tracks 5a, 5b are rotated and driven by means of the turning effort transmitted through the propeller shaft, this being accomplished by using a multiple pulley 59 with a portion of the propeller shaft 7. On either side of pulley 59, which in the present embodiment is a split-pulley, are disposed multiple pulleys 61a, 61b extending parallel thereto. A series of endless belts comprising a plurality of V belts 63a span pulley 61a and pulley 59 secured to propeller shaft 7, while a plurality of V-belts 63b span pulley 61b and said pulley 59. Pulleys 61a and 61b are fixed to rotatable shafts 65a, 65b mounted on sliding plates 67a, 67b which reciprocate horizontally with respect to chassis 17a, 17b. Both side edges of the sliding plates are V-shaped and are guided by rails 69a, 69b having corresponding V-shaped channels. Double-acting air cylinders 71a, 71b are provided for the purpose of sliding the sliding plates 67a, 67b along the rails 69a, 69b. When the air cylinders are actuated to cause the sliding plates 67a, 67b to move outward and thus separate from the propeller shaft, V-belts 63a, 63b are stretched and hence subjected to tension between their respective pulleys 59, 61a and 59, 61b thereby increasing the frictional resistance between the belts and the pulleys. This efficiently transmits the rotation of propeller shaft 7 to shafts 65a and 65b. On the other hand, when sliding plates 67a, 67b are caused to slide inward toward propeller shaft 7, V-belts 63a, 63b slacken so that there is no longer any transmission of propeller shaft rotation to shafts 65a, 65b. Sliding plates 67a, 67b can be controlled such that either of them may be moved independently of the other; thus, it is possible to rotate only one of shafts 65a, 65b, or, if desired, both shafts can be rotated simultaneously or stopped simultaneously.

Shafts 65a, 65b are coupled via universal joints 73a, 73b to shafts 75a, 75b to which respective bevel gears are fixed. Driving wheels 13a, 13b are mounted on shafts 79a, 79b which in turn are rotatably attached to respective chassis 17a, 17b. Secured adjacent the opposite ends of these shafts 79a, 79b are bevel gears 81a, 81b arranged so as to engage with said bevel gears 77a, 77b, respectively. From this construction it can be understood that, when sliding plates 67a, 67b are moved so as to separate from the propeller shaft 7, the rotation of the propeller shaft is transmitted to driven wheels 13a, 13b through the intermediary of respective V-belts 63a, 63b, pulleys 61a, 61b, shafts 65a, 65b, universal joints 73a, 73b, shafts 75a, 75b, bevel gears 77a, 77b, bevel gears 81a, 81b, and shafts 79a, 79b.

In operation, the specialized vehicle of the present invention when travelling on an ordinary road runs by means of the front wheels 1a, 1b and rear wheels 3a, 3b in the manner of a conventional wheeled vehicle. In such a case, endless tracks 5a, 5b are in the elevated position as shown by the broken lines in FIG. 1 since raising and lowering members 35a, 35b have been raised by electric motors 45a, 45b. Accordingly, the lowermost surface of the tracks clears the road surface by a distance of several hundred millimeters. Moreover, the air cylinders 71a, 71b are regulated so that the sliding plates 67a, 67b are positioned in the vicinity of propeller shaft 7 while the truck runs. Accordingly, V-belts 63a, 63b are in a slackened condition so that the rotation of the propeller shaft is not transmitted to pulleys 61a, 61b. Hence, there is no application of driving power to endless tracks 5a, 5b because driving wheels 13a, 13b do not turn.

When the truck begins to run through sandy terrain or on a snow-covered or muddy road, the wheels of the truck, such as rear wheels 3a, 3b, may begin to slip so that the vehicle can make no further progress. In such a case, by operating a switch or lever of a control device located near the driver's seat, electric motors 45a, 45b are brought into action. Pinions 53a, 53b are turned through worm gears 47a, 47b and worm wheels 51a, 51b, thereby lowering racks 55a, 55b. Raising and lowering members 35a, 35b and parallel plates 29a, 29a', 29b, 29b' lower in unison with racks 55a, 55b thereby causing endless tracks 5a, 5b to descend until their lowermost surface comes into contact with the roadway or surface of the ground; once the tracks have attained this position, the electric motors 45a, 45b are turned off. In this condition, the front wheels 1a, 1b, rear wheels 3a, 3b, and endless tracks 5a, 5b are all in contact with the ground. Next, further operation by the driver is of a control device actuating the air cylinders 71a, 71b in such a manner that sliding plates 67a, 67b separate from propeller shaft 7 so that V-belts 63a, 63b are tightened. Now, when propeller shaft 7 is rotated by the truck engine, rear wheels 3a, 3b are rotated through differential gear 9 at the same time that driving wheels 13a, 13b are rotatably driven through the intermediary of the V-belts 63a, 63b. This drives endless tracks 5a, 5b so that the truck can move freely along a poor road surface or through poor terrain. The endless tracks are always driven in the same direction as the wheels. Thus when rear wheels 3a, 3b are driven forward to advance the truck, so too are the endless tracks 5a, 5b; similarly, when the rear wheels are driven backward to allow the truck to back up, the tracks are also driven backward.

According to the invention, the truck is not driven solely by the endless tracks 5a, 5b when travelling along a poor road; the truck runs extremely well because the front wheels 1a, 1b and rear wheels 3a, 3b are also in contact with the road. Further turning the truck left or right can be readily accomplished by turning the steering wheel in a customary manner so as to change the direction of the front wheels 1a, 1b while the air cylinders 71a, 71b are controlled at the same time by simultaneously operating the driver's seat control device. For example, when turning the truck to the left, only the left sliding plate 67a slides in toward the propeller shaft 7 so as to slacken V-belt 63a, this allows the rotation of endless track 5a to cease so that only endless track 5b on the right side is driven. This construction allows the driving mechanism of the endless tracks to be greatly simplified.

In the afore-mentioned construction, propeller shaft 7 is tensioned and caused to bend in one direction whenever one of the V-belts 63a or 63b is tightened while the other is slackened. This is an undesirable situation which is corrected by disposing, on both sides of the propeller shaft, rollers 83a, 83a', 83b, 83b' which are rotatably mounted on cross-beams 85, 85' spanning chassis 17a, 17b, as shown in FIG. 4. The cross-beams and rollers comprise a propeller shaft guide mechanism 87, 87' disposed at the front and rear ends of pulley 59.

Figure 5:
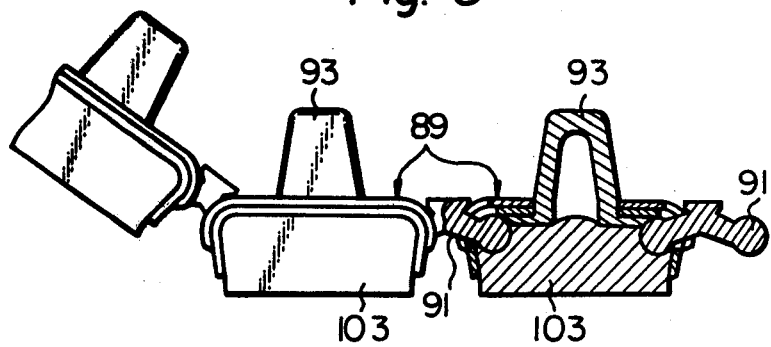
FIG. 5 is a partially cut-away side view showing the construction of an endless track.
Figure 6:
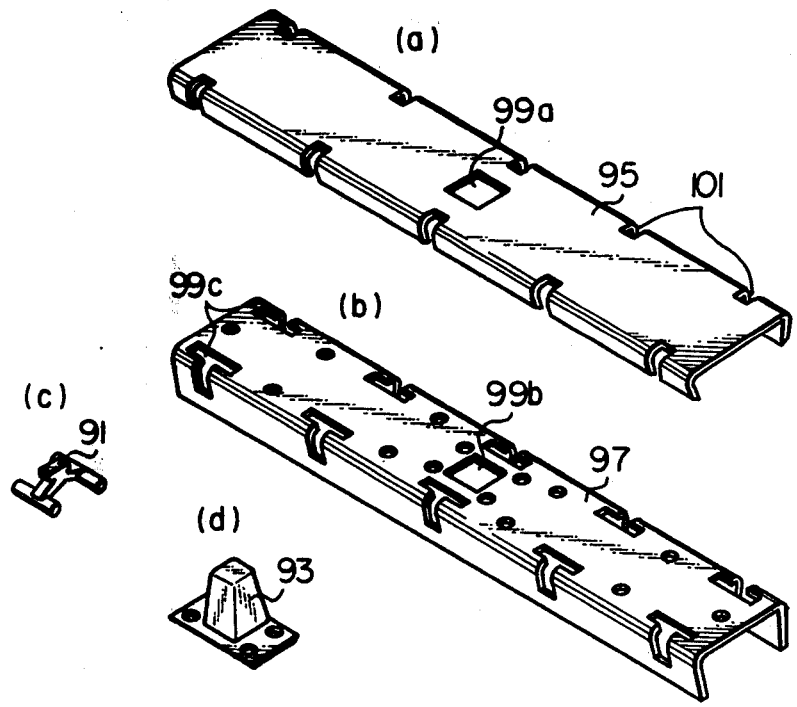
FIG. 6 is a perspective view of the constituent members of an endless track.

FIGS. 5 and 6 show the construction of endless tracks 5a, 5b. As described above, when endless tracks 5a, 5b are brought into use, front wheels 1a, 1b and rear wheels 3a, 3b contact the ground along with the tracks so that the surface of the ground exerts little pressure upon the tracks. Accordingly, the tracks need not possesses as much mechanical strength as would ordinarily be necessary. Endless tracks 5a, 5b include links 91 with connect a multiplicity of traction pad 89 in such a manner that the pads can freely circulate. Disposed within each link 91 is a feeding tooth 93 for engagement with driving wheels 13a, 13b. Traction pad 89 is composed of two over-lapping base plates, i.e., an upper base plate 95 and lower base plate 97, fabricated from high-tension steel plates having a thickness of several millimeters and bent into a substantially U-shaped cross-section, the base plates having, for example, a width of 100 mm and a length of 500 mm. The base plates are provided with through-holes 99a, 99b and 99c as well as cut-outs 101 for the purpose of securing the feeding teeth 93 and in order to allow the links 91 to be attached so as to be freely pivotable. Fitted into and adhered to the inner side of the lower base plate 97 is a block-shaped synthetic rubber track shoe 103 which possesses heat, corrosion and chemical resistance. This construction enables light-weight endless tracks to be fabricated at low cost, while the adoption of rubber track shoes will not subject a road surface to damage.

It should be understood that the present invention is in no way limited to the described embodiment. For example, the present embodiment described a drive system in which the driving wheels 13a, 13b of endless tracks 5a, 5b are turned by the vehicle engine, with turning effort being transmitted by way of the propeller shaft 7. However, a separate engine exclusively for the purpose of driving the driving wheels 13a, 13b can also be installed so that the vehicle engine need not be utilized for operating the tracks. Many other modifications are also possible. For example, instead of adopting the described construction in which the endless tracks 5a, 5b are raised and lowered in unison with the internal raising and lowering mechanism without moving the driving wheels 13a, 13b, it is a simple matter to adopt a construction where the driving wheels are also allowed to ascend or descend together with the elevation mechanism and tracks. Furthermore, a single elevatable endless track can be installed mid-way between the wheels along the center of the chassis rather than installing two endless tracks, one on either side of the truck, as is described in the present embodiment. Still further, separate control members can be provided near the driver's seat for control of the air cylinders 71a, 71b without resorting to operation of the afore-mentioned control means which, in the present embodiment, actuate the air cylinders that drive the sliding plates 67a, 67b when it is desired to change direction during the use of the endless tracks. It is also possible to drive the sliding plates by making use of hydraulic cylinders and an electric motor in place of the air cylinders. Gears, chains or any customary power transmission mechanism can be used in place of the V-belts 63a, 63b for the purpose of transmitting the rotational effort from the propeller shaft to the driving wheels. Should this be attempted, however, it would be preferable to interpose a suitable clutch mechanism between the propeller shaft and driving wheels.

The effects of the present invention may be summarized as follows: (1) A vehicle which adopts the present invention is capable of travelling at high speed and can travel freely over poor roads and poor terrain owing to the provision of an ordinary mechanism for travelling over land as well as an endless track which is lowered into position and utilized only when necessary. (2) Heavy loads can be transported since the ordinary mechanism for land travel is normally used. (3) Simple, light-weight endless tracks can be adopted as well as a simple, inexpensive driving mechanism therefor since the vehicle does not travel solely by means of the endless tracks. (4) Steering can be easily performed since the steering mechanism for ordinary travel continues to be used even when the endless tracks are in operation. (5) The endless track as well as its drive and elevation mechanisms can be installed with almost no modification of the conventional wheeled vehicle mechanism.

What is claimed is:

1. A wheeled vehicle having a source of driving power, a chassis extending longitudinally in said vehicle, a propeller shaft connected to the source of driving power, rear wheels drivably connected to the source of driving power through the propeller shaft, and an auxilliary drive means comprising:
    a pair of rotatable endless track means disposed between a pair of front and rear wheels;
    means for selectively raising and lowering said pair of endless track means with respect to the road surface; and
    means for drivably connecting said endless track means with said source of driving power when said endless track means is lowered and brought into contact with the road surface, said connecting means comprising first and second rotatable shafts for driving said pair of endless track means, said first and second shafts extending parallel to the axis of said propeller shaft, first pulley means fixedly mounted on said propeller shaft and rotatable therewith, second and third pulley means fixedly mounted on said first and second rotatable shafts, respectively, first endless belt means stretched between said first pulley means and said second pulley means, second endless belt means stretched between said first pulley means and said third pulley means and first actuating means for moving said second pulley means closer to and away from the axis of said propeller shaft, and second actuating means for moving said third pulley means closer to and away from the axis of said propeller shaft, said first and second actuating means being independently operable from one another to move said second and third pulley means relative to the axis of said propeller shaft independently of one another.

2. A wheeled vehicle according to claim 1, in which said raising and lowering means comprise a pair of drive wheels mounted on said chassis and drivably connectable to said source of driving power through said connecting means, said drive wheels engaging said pair of endless track means to drive said pair of endless track means, said endless track means including a frame means which moves vertically with respect to said chassis, a pair of guide wheels mounted on said chassis and engaging said endless track frame means to guide said pair of endless track means, respectively, raising and lowering members vertically movably supported by said chassis and disposed in spaces defined by said endless track frame means for moving said endless track frame means vertically with respect to said chassis, first and second pluralities of freely rotatable wheels carried by the lower portions of said raising and lowering members and held in frictional contact with said pair of endless track means, and first and second pluralities of auxilliary guide rollers mounted on the upper portions of said endless track frame means, respectively, and held in frictional contact with said pair of endless track means.

3. A wheeled vehicle according to claim 2, in which said raising and lowering means further comprises driving means mounted on said chassis for driving said raising and lowering members whereby said rotatable wheels and said guide rollers are selectively moved to raised and lowered positions.

4. A wheeled vehicle according to claim 1, wherein each of said pair of endless track means includes track shoe means having two overlapping steel plates having a U-shaped cross-section, feeding teeth and pivotable links mounted thereto, and a plurality of blockshaped synthetic rubber track shoes fitted into and adhered to the inner side of said steel plates.

* * * * *